Patented July 11, 1939

2,165,373

UNITED STATES PATENT OFFICE 2,165,373

PRODUCTION OF LUBRICATING OILS

Gerhard Hofmann, Leuna, Wolfgang Haag, Mannheim, and Hermann Zorn, Ludwigshafen-on-the-Rhine, Germany, assignors to I. G. Farbenindustrie Aktiengesellschaft, Frankfort-on-the-Main, Germany No Drawing. Application April 23, 1938, Serial No. 203,896. In Germany April 24, 1937

4 Claims. (Cl. 196—10)

The present invention relates to the production of lubricating oils.

It is already known that gaseous olefines can be polymerized by the action of anhydrous aluminum chloride or mixtures of the same with iron chloride, titanium chloride or boron fluoride. In this way liquid polymerization products are formed, some of which are of the nature of lubricating oil. Polymerizations of the said kind have already been carried out in the presence of inert solvents, as for example petroleum ether or benzine. When applying these processes to the polymerization of propylene or α-butylene or mixtures thereof, if desired together with subordinate amounts of ethylene, products similar to lubricating oils are thereby obtained only in small yields. Furthermore the said products have so low a viscosity index and so bad an oxidation test that they are not in the least comparable with natural lubricating oils.

We have now found that substantially better results are obtained in the polymerization by means of anhydrous aluminum chloride in the presence of inert solvents by taking care that the gases are entirely free from oxygen and sulphur and their compounds.

It has been found that oxygen and sulphur and their compounds have a very unfavorable influence on the reaction, even when present in small amounts. Such injurious substances include not only oxygen and sulphur but also for example carbon monoxide, carbon dioxide, hydrogen sulphide, carbon oxysulphide, aldehydes, alcohols, esters and mercaptans. Such impurities are always present in gases which contain olefines, such as natural gases, cracking gases, coke-oven gases, low temperature carbonization gases and also the gases obtained by the dehydrogenation of the paraffin hydrocarbons contained in the waste gases from destructive hydrogenation. They are also contained in the gases which are obtained in the preparation of acetylene from the hydrocarbons of the paraffin series by treatment in the electric arc. Injurious substances, such as aldehydes, alcohols and esters are also formed in the production of propylene or α-butylene by the splitting off of water from alcohols, and injurious substances are also contained in ethylene homologues which have been prepared by splitting off hydrogen halides from the corresponding alkyl halides. All these injurious substances are frequently present in the gaseous olefines in only very small amounts so that they can only be detected by the finest analytical means or even only by their odour. These small amounts of impurities are, however, sufficient to influence suite considerably the course of the reaction so that either the quality of the polymerization products is greatly impaired or the reaction is almost entirely stopped.

Other gaseous impurities, such as hydrogen, nitrogen or methane on the other hand, have no injurious influence provided they are not present in too large an amount.

The purification of the gases can be effected to a great extent by means of known physical methods such as adsorption with active carbon or silica gel or liquefaction and subsequent fractional distillation in a Linde plant. These physical methods are, however, insufficient for the removal of the last traces of obnoxious impurities and one or more chemical methods must also be used. Such chemical methods may consist for example, depending on the nature of the impurities, of washing with caustic alkali solutions, leading over anhydrous calcium chloride or over chromic acid applied to pumice, or leading the gases through fused sodamide or treating the gases with organic bases or solutions of the same or also with solutions of salts of strong bases with weak acids, as for example the sodium salt of alanine. These chemical purification processes are advantageously carried out under increased pressure, as for example between about 5 and about 50 atmospheres. The temperature to be used in the purification depends on the nature of the purifying agent and the impurities to be removed.

It has also been found that the material of the reaction vessels in which the polymerization is carried out is of considerable influence on the yield and nature of the polymerization products. In order to obtain good lubricating oils, there must be used for the reaction vessels materials which have no unfavorable catalytic influence on the polymerization process. It has been found that ordinary iron, such as cast iron or wrought iron, and also ordinary non-alloy steels have an injurious action on the course of the polymerization. Suitable materials for the construction of the apparatus which must naturally also have the necessary mechanical strength and a sufficient stability to corrosion by the aluminum chloride, are on the other hand nickel and chromium and steels alloyed with nickel and/or chromium. It is not necessary to prepare the whole reaction vessel from these constructional materials, but it is sufficient for the internal parts coming into contact with the reacting substances to be of the said materials. At all the said parts, however, the use of iron or ordinary steels, which materials are intended by the expression "free iron" as used herein, even in small amounts, must be avoided. The polymerization may also be carried out in vessels which are lined for example with lead, tin or zinc. These materials have the drawback, however, that their stability to corrosion is smaller than that of the above mentioned substances.

Finally it has been found that the nature of the aluminum chloride is of great importance for the course of the polymerization. Commercial aluminum chloride usually contains substantial amounts exceeding 5 per cent of residue which is incapable of sublimation. The presence of such large amounts of impurities is due to the fact that in the sublimation of aluminum chloride as ordinarily carried out a considerable amount of substances which are ordinarily considered to be not volatilizable is carried over with the aluminum chloride vapours and to the further fact that aluminum chloride is highly sensitive against atmospheric moisture. According to the present invention the aluminum chloride should contain less than 5 per cent and advantageously less than 2.5 per cent of residue incapable of sublimation, such as aluminum oxide, hydroxide, or oxychloride. A content of iron chloride is not injurious, but a content of iron oxide or similar non-volatile substances is injurious. In order, during the introduction of the aluminum chloride into the autoclave, to avoid the formation of non-volatile compounds, such as aluminum oxide and the like, by the action of the moisture in the air, it is preferable to use the aluminum chloride in the form of its liquid addition compounds with olefines which can be prepared, as is already known, from liquid or gaseous olefines while excluding atmospheric moisture.

All paraffin hydrocarbon mixtures, as for example petroleum ether or the paraffin hydrocarbon mixtures which are obtained by the hydrogenation of the products formed by cracking paraffin waxes, fats and fatty oils are suitable as inert solvents for dissolving the gaseous olefines and for suspending the aluminum chloride or its addition compounds with olefines. Fused or commercial hard and soft paraffin waxes are also suitable as solvents although their recovery from the resulting polymerization product is somewhat more troublesome than that of the aforesaid liquid hydrocarbons. The oils obtained as first runnings in a previous polymerization are also very suitable as solvents. Their use offers the advantage that no foreign hydrocarbons at all are present during the polymerization. The whole crude polymerization product may, however, also be used as a solvent.

The polymerization may be carried out at any suitable temperature. When working at ordinary room temperature or at even lower temperatures, the reaction usually proceeds slowly. It is, therefore, preferable to employ higher temperatures, for example by heating the reaction vessel to between 70° and 80° C. or more. At this temperature a rapid exothermic reaction sets in, which may cause the temperature in the reaction vessel to rise temporarily as high as from 230° to 250° C.

The following example serves to illustrate how the said invention may be carried out in practice, but the invention is not restricted to this example. The parts are by weight.

Example 30 parts of aluminum chloride containing 1.2 per cent of residue incapable of sublimation are suspended in 300 parts of a purely paraffinic solvent, for example petroleum ether. Purified propylene is then led in at 60° C., while stirring until after 6 hours an increase in weight of 308 parts is ascertained. The reaction product is washed with water and freed of low boiling oils by distillation. The lubricating oil obtained in an amount of 250 parts boils above 170° C. under a pressure of 0.5 millimeter (mercury gauge); it has the following characteristics:

Viscosity at 38° C_____° Engler__ 138
Viscosity at 99° C_____do____ 4.64
Viscosity index_____ 55

If the same treatment be applied to propylene which contains a small amount of hydrogen sulphide (less than 1 per cent), the increase in weight ascertained after the same time only amounts to 83 parts, while the output of oil obtained from the reaction product only amounts to 45 parts. The lubricating oil thus obtained which boils above 170° C. at a pressure of 0.5 millimeters (mercury gauge) has the following characteristics:

Viscosity at 38° C_____° Engler__ 131
Viscosity at 99° C_____do____ 4.24
Viscosity index_____ 30

Alpha-butylene shows a similar behavior.

What we claim is:

1. The process of producing a high quality lubricating oil which comprises contacting with a polymerizing agent, selected from the group consisting of anhydrous aluminum chloride containing less than 5% of residue incapable of sublimation and the double compounds of such aluminum chloride with olefins, at a polymerizing temperature and in the presence of an inert solvent a gas essentially comprising an olefin selected from the group consisting of propylene and α-butylene, which gas is free from oxygen and sulfur and the compounds of these elements, the reacting materials being precluded from contact with free iron.

2. The process claimed in claim 1, in which the reacting materials are confined in a reaction space consisting of a material selected from the group consisting of nickel, chromium and alloy steels containing at least one of these elements.

3. The process claimed in claim 1 in which the reacting materials are confined in a reaction space consisting of a material selected from the group consisting of nickel, chromium and alloy steels containing at least one of these elements, and the aluminum chloride contains less than 2.5% of residue incapable of sublimation.

4. In the process claimed in claim 1, working with an aluminum chloride which contains less than 2.5 per cent of residue incapable of sublimation.

GERHARD HOFMANN.
WOLFGANG HAAG.
HERMANN ZORN.